US012292025B2

(12) United States Patent
Cheng et al.

(10) Patent No.: US 12,292,025 B2
(45) Date of Patent: May 6, 2025

(54) FLOATING PLATFORM INTEGRATING WAVE ATTENUATION WITH MARINE ENERGY POWER GENERATION AND WORKING METHOD THEREOF

(71) Applicant: JIANGSU UNIVERSITY OF SCIENCE AND TECHNOLOGY, Jiangsu (CN)

(72) Inventors: Yong Cheng, Jiangsu (CN); Yinong Hu, Jiangsu (CN); Chunyan Ji, Jiangsu (CN)

(73) Assignee: JIANGSU UNIVERSITY OF SCIENCE AND TECHNOLOGY, Jiangsu (CN)

( * ) Notice: Subject to any disclaimer, the term of this patent is extended or adjusted under 35 U.S.C. 154(b) by 0 days.

(21) Appl. No.: 18/798,763

(22) Filed: Aug. 8, 2024

(65) Prior Publication Data

US 2025/0052222 A1 Feb. 13, 2025

(30) Foreign Application Priority Data

Aug. 11, 2023 (CN) ........................ 202311010448.7

(51) Int. Cl.

*F03B 13/00* (2006.01)
*B63B 35/44* (2006.01)
*F03B 13/20* (2006.01)

(52) U.S. Cl.

CPC .............. *F03B 13/20* (2013.01); *B63B 35/44* (2013.01); *B63B 2035/446* (2013.01); *B63B 2035/4466* (2013.01)

(58) Field of Classification Search

CPC ... F03B 13/20; B63B 35/44; B63B 2035/446; B63B 2035/4466; B63B 1/107; B63B 17/00; B63B 2017/009; F03D 13/25; H02K 35/00

See application file for complete search history.

(56) References Cited

U.S. PATENT DOCUMENTS 4,123,667 A * 10/1978 Decker ................ F03B 13/188 60/497
2015/0211477 A1* 7/2015 Wright .................... F03D 13/25 290/53

* cited by examiner

*Primary Examiner* — Julio C. Gonzalez
(74) *Attorney, Agent, or Firm* — JCIPRNET

(57) ABSTRACT

Disclosed is a floating platform integrating wave attenuation with marine energy power generation and a working method thereof, the platform includes a breakwater, a tuned damping wave energy converter, and an offshore floating wind turbine. The breakwater includes double-cylindrical-boxes and connecting bulkheads, and a moon pool area is formed in a middle of the breakwater; the offshore floating wind turbine and the tuned damping wave energy converter are both connected to the breakwater through a connecting rod. A circular groove is formed on an inner side of each of the connecting bulkheads of the breakwater. The breakwater provides the floating base and power generation environment for the offshore floating wind turbine and the tuned damping wave energy converter, and a plurality of the tuned damping wave energy converters can be disposed, and are evenly distributed beneath the offshore floating wind turbine.

3 Claims, 4 Drawing Sheets

FLOATING PLATFORM INTEGRATING WAVE ATTENUATION WITH MARINE ENERGY POWER GENERATION AND WORKING METHOD THEREOF

CROSS-REFERENCE TO RELATED APPLICATION

This application claims the priority benefit of China application serial no. 202311010448.7, filed on Aug. 11, 2023. The entirety of the above-mentioned patent application is hereby incorporated by reference herein and made a part of this specification.

BACKGROUND

Technical Field

The present disclosure relates to the field of marine engineering, and particularly relates to a floating platform integrating wave attenuation with marine energy power generation and a working method thereof.

Description of Related Art

In recent years, a utilization rate of offshore renewable energy has been significantly improved thanks to the research and utilization of floating platforms, such as offshore floating wind turbines, floating solar panels, and floating wave energy converters. The present disclosure provides a multifunctional floating platform, which integrates wave attenuation with marine energy power generation in combination with characteristics of an offshore floating breakwater, and complements the breakwater to a power generation structure, such that power can be generated using marine energy, waves are attenuated, ports and ponds are protected, and near-shore fisheries and shipping safety are guaranteed.

SUMMARY

An objective of the present disclosure is to provide a floating platform integrating wave attenuation with marine energy power generation and a working method thereof. The platform can employ a breakwater structure to reduce wave heights, create sheltered sea areas, and solve the problems faced by coastal buildings, fisheries, and shipping that are vulnerable to wave impacts. In addition, the platform can generate power from offshore wind and wave energy while solving the problem that an offshore floating wind turbine is easily damaged by waves.

The present disclosure provides a technical solution as follows: a floating platform integrating wave attenuation with marine energy power generation, comprising a breakwater, a tuned damping wave energy converter, and an offshore floating wind turbine;

- where the breakwater is composed of a double-cylindrical-box structure and connecting bulkheads, and provides a floating base for the offshore floating wind turbine and the tuned damping wave energy converter, and a moon pool area is formed in a middle of the breakwater; and
- the offshore floating wind turbine and the tuned damping wave energy converter are both connected to the breakwater through a connecting rod, the offshore floating wind turbine and the tuned damping wave energy converter are both mounted on both installed on a circular pile column in a middle of the connecting rod and located in the moon pool area, the tuned damping wave energy converter converts wave energy into electrical energy, and hydraulic power generation damping systems of the tuned damping wave energy converter have a time lag during operation, which tunes and reduces vibration of the offshore floating wind turbine, such that movements of the hydraulic power generation damping systems and the offshore floating wind turbine are complemented.

Preferably, the breakwater is composed of a double-cylindrical-box structure and connecting bulkheads, the double-cylindrical-box structure is composed of two cylindrical boxes that are parallel to each other, two ends of the double-cylindrical-box structure are connected to each other through the connecting bulkheads, a moon pool area is formed in a middle of the double-cylindrical-boxes, and the breakwater provides the floating base for the offshore floating wind turbine, and provides a working environment for the offshore floating wind turbine and the tuned damping wave energy converter.

Preferably, the breakwater is connected to the offshore floating wind turbine and the tuned damping wave energy converter through the connecting rod, a circular groove is formed on an inner side of each of the connecting bulkheads of the breakwater, each end of the connecting rod is provided with a self-adaptive connecting disk, and the self-adaptive connecting disk extends into the circular groove and is then connected with the circular groove in a sliding manner, such that the connecting rod and the breakwater can roll relative to each other.

Preferably, the self-adaptive connecting disk is a disk structure, and a first circular notch is formed on a circumferential end surface of the self-adaptive connecting disk; after the self-adaptive connecting disk extends into the circular groove, a second circular notch is formed on an inner wall of the circular groove directly opposite to the first circular notch, the first circular notch and the second circular notch form a sliding track, a roller is disposed inside the sliding track, and the self-adaptive connecting disk keeps relatively stationary when the roller makes the self-adaptive connecting disk rotate inside the circular groove.

Preferably, the circular pile column is disposed in a middle of the connecting rod, and an upper end surface of the circular pile column is connected to a tower of the offshore floating wind turbine; a wave energy converter mounting platform is disposed on an outer wall below the upper end surface of the circular pile column, and the tuned damping wave energy converter is mounted on the wave energy converter mounting platform; and a ballast tank is mounted on a lower end surface of the circular pile column, and the ballast tank is configured to lower a center of gravity of the floating platform.

Preferably, inclined braces are evenly disposed between a bottom end surface of the wave energy converter mounting platform and the circular pile column, and the inclined braces are capable of further improving load-bearing capacity of the wave energy converter mounting platform.

Preferably, the moon pool area utilizes its resonance effect to provide a wave field for the tuned damping wave energy converter, thereby increasing an energy density of wave energy.

Preferably, the tuned damping wave energy converter includes semicircular disks disposed on both sides of the circular pile column, hydraulic power generation damping systems, and array-type oscillating power generation floats, where the semicircular disks are connected to the wave energy converter mounting platform in a middle of the circular pile column through bolts, a lower end surface of each of the semicircular disks is provided with the hydraulic power generation damping systems distributed in an array, and a lower end of each of the hydraulic power generation damping systems is connected to the array-type oscillating power generation floats through tension-compression rods.

Preferably, the hydraulic power generation damping systems and the array-type oscillating power generation floats are evenly distributed in pairs beneath a circular table formed by the two semicircular disks, the array-type oscillating power generation floats convert wave energy into mechanical energy, and the hydraulic power generation damping systems then convert the mechanical energy into electrical energy.

A working method of the floating platform integrating wave attenuation with marine energy power generation is as follows: when the breakwater is affected by waves and starts to sway, the cylindrical boxes accordingly shake, driving the connecting bulkheads to shake; and the connecting rod is in rolling connection with the connecting bulkheads through the self-adaptive connecting disk, such that mutual movements among the breakwater and the offshore floating wind turbine, and the tuned damping wave energy converter are separated.

The moon pool area in the middle of the breakwater provides the wave field for the tuned damping wave energy converter, and the tuned damping wave energy converter generates power using wave energy in the wave field.

When the offshore floating wind turbine sways due to the impact of waves and wind, the connecting rod is driven to shake as a whole, such that the hydraulic power generation damping systems of the tuned damping wave energy converter are driven to shake, stokes of the hydraulic power generation damping systems are accordingly increased, and power generation efficiency of wave energy is improved, in which case, affected by damping force of the hydraulic power generation damping systems themselves, movements of the hydraulic power generation damping systems lag behind movements of the offshore floating wind turbine, thereby reducing sway, tuning and reducing vibration of the offshore floating wind turbine.

Beneficial Effects:

(1) The floating platform of the present disclosure integrates wave attenuation with marine energy power generation, and features a simple structure, high flexibility, and good mobility, making it easy to construct, transport, maintain and dismantle, and construction cost of the floating platform does not increase rapidly with water depth.

(2) The breakwater structure of the present disclosure effectively achieves an effect of wave attenuation, significantly reducing the impact of waves on coastal structures, protecting ports and ponds, maintaining a nearshore water surface relatively stable, and effectively safeguarding the safety of nearshore fisheries and shipping.

(3) The moon pool area formed in the middle of the breakwater in the present disclosure increases the energy density of wave energy, and provides a good wave field for the tuned damping wave energy converter, and a working environment for the offshore floating wind turbine.

(4) The offshore floating wind turbine and the tuned damping wave energy converter are both connected to the breakwater through the connecting rod, the connecting rod and the breakwater are connected to each other through the self-adaptive connecting disk, allowing for rolling movements between them, which effectively reduces the impact of movements of the breakwater on the tuned damping wave energy converter and the offshore floating wind turbine in the moon pool area.

(5) The present disclosure integrates the breakwater, the offshore floating wind turbine, and the tuned damping wave energy converter, making functions of the three complementary, specifically, the breakwater provides the floating base and good power generation environment for the offshore floating wind turbine and the tuned damping wave energy converter, and a plurality of the tuned damping wave energy converters can be disposed, and are evenly distributed beneath the offshore floating wind turbine, thereby tuning and reducing vibration of the offshore floating wind turbine, and ensuring stable power generation of the wind energy. Furthermore, vibrations caused by the waves and wind acting on the offshore floating wind turbine improve the power generation efficiency of the tuned damping wave energy converter.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
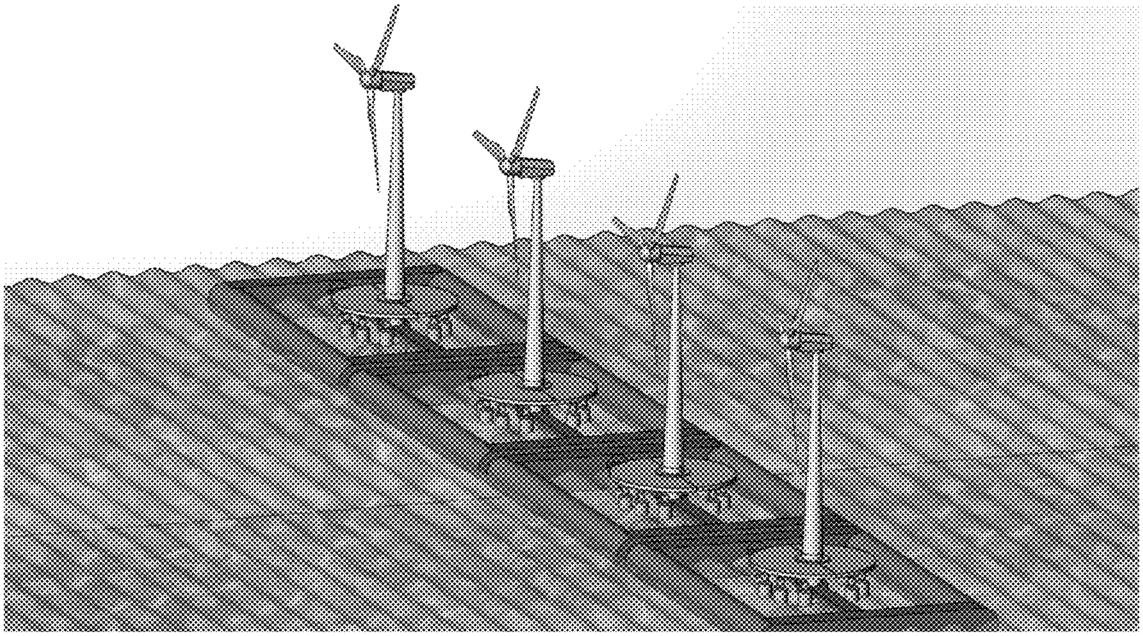
FIG. 1 is a simplified three-dimensional schematic diagram of an overall structure according to the present disclosure.
Figure 2:
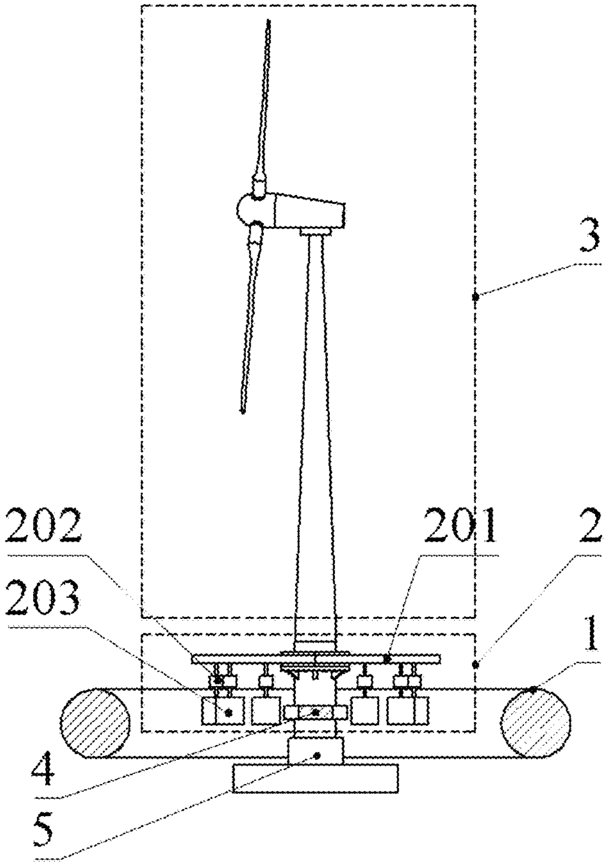
FIG. 2 is a schematic diagram of an overall structural layout according to the present disclosure.
Figure 3:
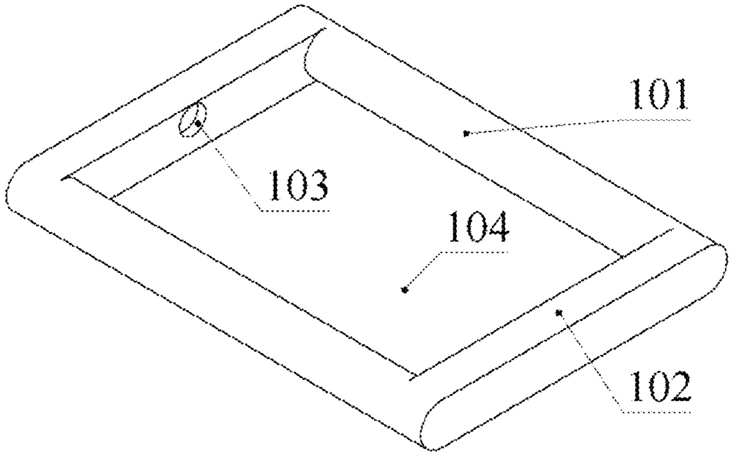
FIG. 3 is a simplified schematic diagram of a wave attenuation structure according to the present disclosure.
Figure 4:
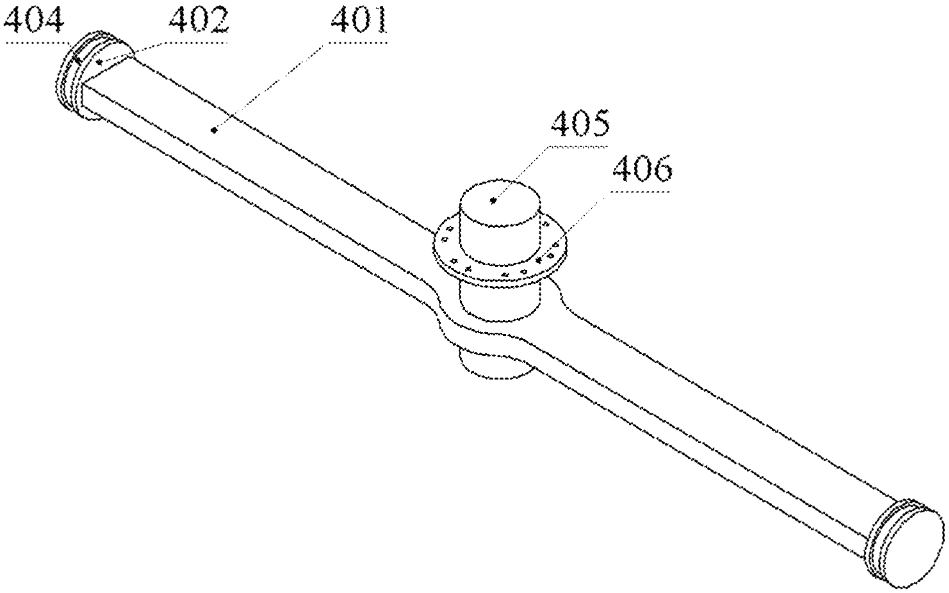
FIG. 4 is a schematic diagram of a design of a connecting rod according to the present disclosure.
Figure 5:
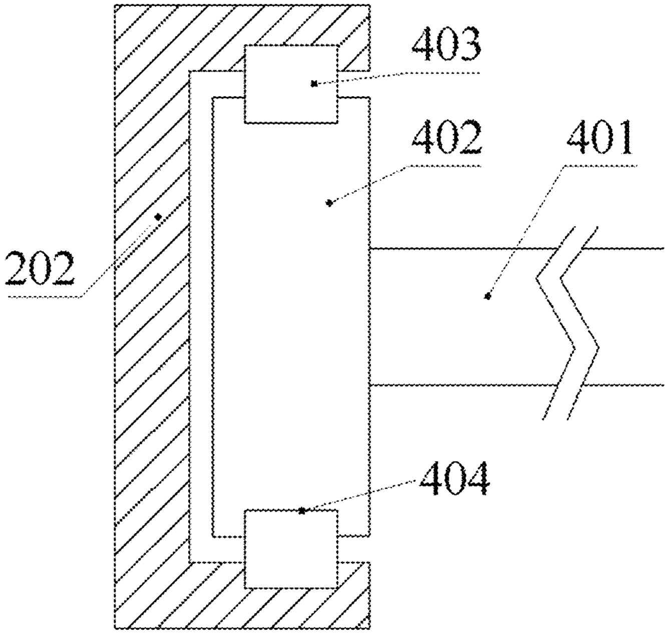
FIG. 5 is a schematic diagram of a connection method between a connecting rod and a breakwater according to the present disclosure.
Figure 6:
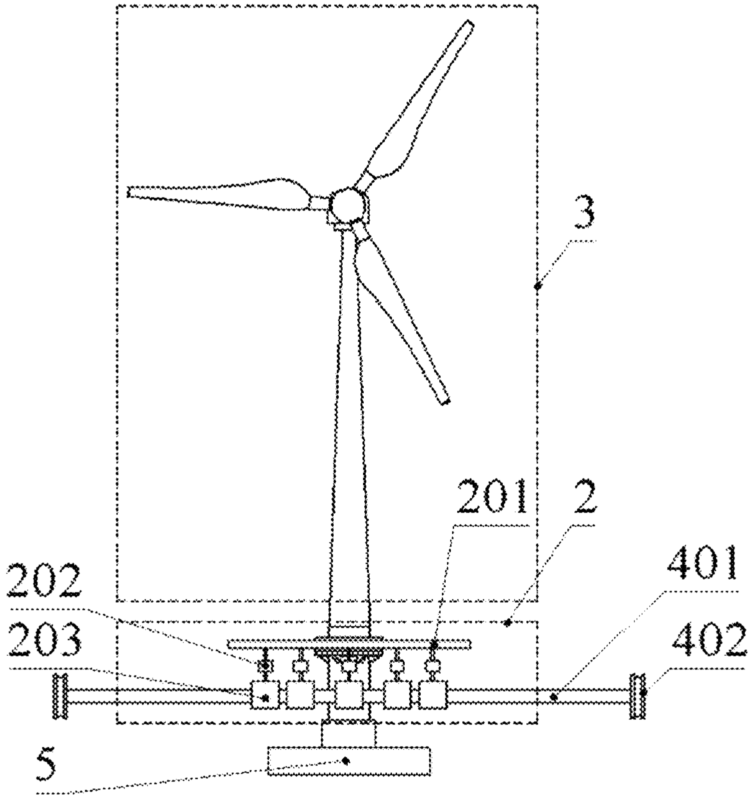
FIG. 6 is a schematic diagram of an offshore floating wind turbine and a tuned damping wave energy converter mounted on a connecting rod according to the present disclosure.
Figure 7:
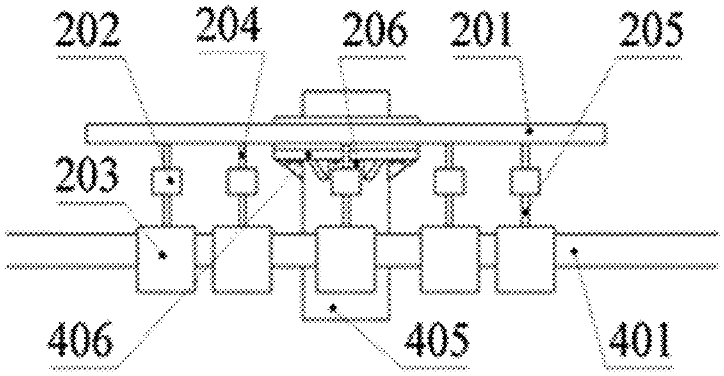
FIG. 7 is a simplified structural schematic diagram of a tuned damping wave energy converter according to the present disclosure.
Figure 8:
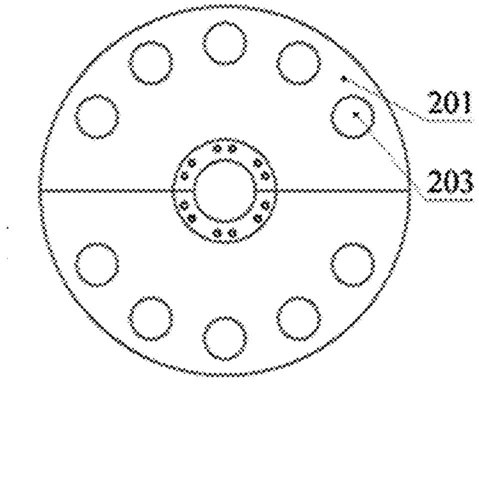
FIG. 8 is a top view of a wave energy converter mounting platform according to the present disclosure.

The technical solutions of embodiments of the present disclosure will be described below clearly and comprehensively in conjunction with accompanying drawings of the embodiments of the present disclosure. Apparently, the embodiments described are merely some embodiments rather than all embodiments of the present disclosure. Based on the embodiments of the present disclosure, all other embodiments acquired by those of ordinary skill in the art without making creative efforts fall within the scope of protection of the present disclosure.

In the description of the present disclosure, it is to be understood that the terms “central”, “longitudinal”, “transverse", "length", "width", "thickness", "upper", "lower", "front", "back", "left", "right", "vertical", "horizontal", "top", "bottom", "inner", "outer", "clockwise", "counter-clockwise", etc. indicate azimuthal or positional relations based on those shown in the drawings only for ease of description of the present disclosure and for simplicity of description, and are not intended to indicate or imply that the referenced device or element must have a particular orientation and be constructed and operative in a particular orientation, and thus may not be construed as a limitation on the present disclosure.

In the present disclosure, unless expressly specified otherwise, the terms "mount", "connect", "arrange", etc. are to be construed broadly and, for example, may be fixedly connected or arranged, or detachably connected or arranged, or integrally connected or arranged. Those of ordinary skill in the art can understand specific meanings of the above terms in the present disclosure according to specific circumstances.

Furthermore, the terms "first" and "second" are merely for the purpose of description, and cannot be construed as indicating or implying relative importance or implicitly specifying the number of technical features indicated. Thus, features defined by "first" and "second" may explicitly or implicitly include one or more of the features. In the description of the present disclosure, "plurality" means two or more, unless expressly specified otherwise.

As shown in FIG. 1, a floating platform integrating wave attenuation with marine energy power generation is provided. In this embodiment, a plurality of the floating platforms in the present disclosure are arranged in a row to achieve effects of wave attenuation, reducing wave height, and efficiently utilizing marine energy for power generation.

FIG. 2 to FIG. 8 are structural schematic diagrams of the present disclosure. In this embodiment, the platform includes a breakwater 1, a tuned damping wave energy converter 2, and an offshore floating wind turbine 3, where the breakwater 1 is composed of a double-cylindrical-box structure and connecting bulkheads 102, two cylindrical boxes 101 in the double-cylindrical-box structure are identical and parallel, two ends of the double-cylindrical-box structure 101 are connected through the connecting bulkheads 102, and a moon pool area 104 with a large space is formed in a middle of the breakwater 1; the breakwater 1 not only provides a floating base for the offshore floating wind turbine 3, but is also configured to accommodate the tuned damping wave energy converter 2; and the moon pool area 104 utilizes its resonance effect to provide a wave field for the tuned damping wave energy converter 2, thereby increasing an energy density of wave energy.

In this embodiment, the breakwater 1 is connected to the offshore floating wind turbine 3 and the tuned damping wave energy converter 2 through a connecting rod 4, a circular groove 103 is formed on an inner side of each of the connecting bulkheads 102 of the breakwater 1, each end of the connecting rod 4 is provided with a self-adaptive connecting disk 402, and the self-adaptive connecting disk 402 extends into the circular groove 103 and is then connected with the circular groove 103 in a sliding manner, such that the connecting rod 4 and the breakwater 1 can roll relative to each other.

In this embodiment, the self-adaptive connecting disk 402 is a disk structure, and a first circular notch is formed on a circumferential end surface of the self-adaptive connecting disk 402; after the self-adaptive connecting disk 402 extends into the circular groove 103, a second circular notch is formed on an inner wall of the circular groove 103 directly opposite to the first circular notch, the first circular notch and the second circular notch form a sliding track 404, a roller 403 is disposed inside the sliding track 404, and the self-adaptive connecting disk 402 keeps relatively stationary when the roller 403 makes the self-adaptive connecting disk 402 rotate inside the circular groove 103.

In this embodiment, a circular pile column 405 is disposed in a middle of the connecting rod 4, and an upper end surface of the circular pile column 405 is connected to a tower of the offshore floating wind turbine 3; a wave energy converter mounting platform 406 is disposed on an outer wall below the upper end surface of the circular pile column 405, and the tuned damping wave energy converter 2 is mounted on the wave energy converter mounting platform 406; and a ballast tank 5 is mounted on a lower end surface of the circular pile column 405, and the ballast tank 5 is configured to lower a center of gravity of the floating platform.

In this embodiment, in order to improve load-bearing capacity of the wave energy converter mounting platform 406, inclined braces are evenly disposed between a bottom end surface of the wave energy converter mounting platform 406 and the circular pile column 405, the inclined braces are capable of further improving load-bearing capacity of the wave energy converter mounting platform 406 when carrying the offshore floating wind turbine 3.

In this embodiment, the tuned damping wave energy converter 2 includes semicircular disks 201 positioned on both side of the circular pile column 405, hydraulic power generation damping systems 202, and array-type oscillating power generation floats 203, where the semicircular disks 201 are connected to the wave energy converter mounting platform 406 in a middle of the circular pile column 405 through bolts, a lower end surface of each of the semicircular disks 201 is provided with the hydraulic power generation damping systems 202 distributed in an array, a lower end of each of the hydraulic power generation damping systems 202 is connected to the array-type oscillating power generation floats 203 through tension-compression rods 204, the hydraulic power generation damping systems 202 and the array-type oscillating power generation floats 203 are evenly distributed in pairs beneath a circular table formed by the two semicircular disks 201, the array-type oscillating power generation floats 203 convert wave energy into mechanical energy, and the hydraulic power generation damping systems 202 then convert the mechanical energy into electrical energy.

During operation, when the breakwater 1 is affected by waves and starts to sway, the cylindrical boxes 101 accordingly shake, driving the connecting bulkheads 102 to shake; and the connecting rod 4 is in rolling connection with the connecting bulkheads 102 through the self-adaptive connecting disk 402, such that mutual movements among the breakwater 1 and the offshore floating wind turbine 3, and the tuned damping wave energy converter 2 are separated.

The moon pool area 104 in the middle of the breakwater 1 provides the wave field for the tuned damping wave energy converter 2, and the tuned damping wave energy converter 2 generates power using wave energy in the wave field.

When the offshore floating wind turbine 3 sways due to the impact of waves and wind, the connecting rod 4 is driven to shake as a whole, such that the hydraulic power generation damping systems 202 of the tuned damping wave energy converter 2 are driven to shake, stokes of the hydraulic power generation damping systems 202 are accordingly increased, and power generation efficiency of wave energy is improved, in which case, affected by damping force of the hydraulic power generation damping systems 202 themselves, movements of the hydraulic power generation damping systems 202 lag behind movements of the offshore floating wind turbine 3, thereby reducing sway, tuning and reducing vibration of the offshore floating wind turbine 3.

The present disclosure integrates the breakwater 1, the offshore floating wind turbine 3, and the tuned damping wave energy converter 2, making functions of the three complementary, specifically, the breakwater 1 provides the floating base and good power generation environment for the offshore floating wind turbine 3 and the tuned damping wave energy converter 2, and a plurality of the tuned damping wave energy converters 2 can be disposed, and are evenly distributed beneath the offshore floating wind turbine 3, thereby tuning and reducing vibration of the offshore floating wind turbine 3, and ensuring stable power generation of the wind energy. Furthermore, vibrations caused by the waves and wind acting on the offshore floating wind turbine 3 improve the power generation efficiency of the tuned damping wave energy converter 2.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A floating platform integrating wave attenuation with marine energy power generation, the floating platform comprising a breakwater, a tuned damping wave energy converter, and an offshore floating wind turbine; wherein the breakwater is composed of a double-cylindrical-box structure and connecting bulkheads, the double-cylindrical-box structure is composed of two cylindrical boxes that are parallel to each other, two ends of the double-cylindrical-box structure are connected to each other through the connecting bulkheads, a moon pool area is formed in a middle of the double-cylindrical-box structure, and the breakwater provides a floating base and a working environment for the offshore floating wind turbine and the tuned damping wave energy converter;

the moon pool area utilizes its resonance effect to provide a wave field for the tuned damping wave energy converter, thereby increasing an energy density of wave energy;

the offshore floating wind turbine and the tuned damping wave energy converter are both connected to the breakwater through a connecting rod, the offshore floating wind turbine and the tuned damping wave energy converter are both mounted and installed on a circular pile column in a middle of the connecting rod and located in the moon pool area, the tuned damping wave energy converter converts wave energy into electrical energy, and hydraulic power generation damping systems of the tuned damping wave energy converter have a time lag during operation, which tunes and reduces vibration of the offshore floating wind turbine, such that movements of the hydraulic power generation damping systems and the offshore floating wind turbine are complemented;

the breakwater is connected to the offshore floating wind turbine and the tuned damping wave energy converter through the connecting rod, a circular groove is formed on an inner side of each of the connecting bulkheads of the breakwater, each end of the connecting rod is provided with a self-adaptive connecting disk, and the self-adaptive connecting disk extends into the circular groove and is then connected with the circular groove in a sliding manner, such that the connecting rod and the breakwater is able to roll relative to each other;

the self-adaptive connecting disk is a disk structure, and a first circular notch is formed on a circumferential end surface of the self-adaptive connecting disk; after the self-adaptive connecting disk extends into the circular groove, a second circular notch is formed on an inner wall of the circular groove directly opposite to the first circular notch, the first circular notch and the second circular notch form a sliding track, a roller is disposed inside the sliding track, and the self-adaptive connecting disk keeps relatively stationary when the roller makes the self-adaptive connecting disk rotate inside the circular groove;

the circular pile column is disposed in a middle of the connecting rod, and an upper end surface of the circular pile column is connected to a tower of the offshore floating wind turbine; a wave energy converter mounting platform is disposed on an outer wall below the upper end surface of the circular pile column, and the tuned damping wave energy converter is mounted on the wave energy converter mounting platform; and a ballast tank is mounted on a lower end surface of the circular pile column, and the ballast tank is configured to lower a center of gravity of the floating platform;

the tuned damping wave energy converter comprises semicircular disks disposed on both sides of the circular pile column, hydraulic power generation damping systems, and array-type oscillating power generation floats, wherein the semicircular disks are connected to the wave energy converter mounting platform in a middle of the circular pile column through bolts, a lower end surface of each of the semicircular disks is provided with the hydraulic power generation damping systems distributed in an array, and a lower end of each of the hydraulic power generation damping systems is connected to the array-type oscillating power generation floats through tension-compression rods;

when the breakwater is affected by waves and starts to sway, the cylindrical boxes accordingly shake, driving the connecting bulkheads to shake; and the connecting rod is in rolling connection with the connecting bulkheads through the self-adaptive connecting disk, such that mutual movements among the breakwater and the offshore floating wind turbine, and the tuned damping wave energy converter are separated;

the moon pool area in a middle of the breakwater provides the wave field for the tuned damping wave energy converter, and the tuned damping wave energy converter generates power using wave energy in the wave field; and when the offshore floating wind turbine sways due to an impact of waves and wind, the connecting rod is driven to shake as a whole, such that the hydraulic power generation damping systems of the tuned damping wave energy converter are driven to shake, stokes of the hydraulic power generation damping systems are accordingly increased, and power generation efficiency of wave energy is improved, affected by damping force of the hydraulic power generation damping systems, movements of the hydraulic power generation damping systems lag behind movements of the offshore floating wind turbine, thereby reducing sway, tuning and reducing vibration of the offshore floating wind turbine.

2. The floating platform integrating wave attenuation with marine energy power generation according to claim 1, wherein inclined braces are evenly disposed between a bottom end surface of the wave energy converter mounting platform and the circular pile column, the inclined braces are capable of improving load-bearing capacity of the wave energy converter mounting platform.

3. The floating platform integrating wave attenuation with marine energy power generation according to claim 1, wherein the hydraulic power generation damping systems and the array-type oscillating power generation floats are evenly distributed in pairs beneath a circular table formed by the two semicircular disks, the array-type oscillating power generation floats convert wave energy into mechanical energy, and the hydraulic power generation damping systems then convert the mechanical energy into electrical energy.

* * * * *